US008887084B2

(12) United States Patent
Kim

(10) Patent No.: US 8,887,084 B2
(45) Date of Patent: Nov. 11, 2014

(54) LETTER INPUT METHOD

(75) Inventor: Youn Soo Kim, Seoul (KR)

(73) Assignee: Intellectual Discovery, Inc., Seoul (KR)

( * ) Notice: Subject to any disclaimer, the term of this patent is extended or adjusted under 35 U.S.C. 154(b) by 108 days.

(21) Appl. No.: 13/122,398

(22) PCT Filed: Aug. 19, 2009

(86) PCT No.: PCT/KR2009/004608
§ 371 (c)(1),
(2), (4) Date: May 5, 2011

(87) PCT Pub. No.: WO2010/038942
PCT Pub. Date: Apr. 8, 2010

(65) Prior Publication Data
US 2011/0214084 A1    Sep. 1, 2011

(30) Foreign Application Priority Data

Oct. 2, 2008    (KR) ........................ 10-2008-0097255

(51) Int. Cl.
*G06F 3/048*    (2013.01)
*G06F 3/0488*   (2013.01)
(52) U.S. Cl.
CPC ................ *G06F 3/04886* (2013.01);
*G06F 3/04883* (2013.01)
USPC ......................................... 715/780; 715/268
(58) Field of Classification Search
CPC ... G06F 3/0237; G06F 3/0481; G06F 3/0482; G06F 17/276; G06F 17/243
USPC ................................................ 715/780, 268
See application file for complete search history.

(56) References Cited

U.S. PATENT DOCUMENTS 6,088,481 A * 7/2000 Okamoto et al. ............. 382/189
6,661,409 B2 * 12/2003 Demartines et al. .......... 345/173
(Continued)

FOREIGN PATENT DOCUMENTS

JP    03-091019 A    4/1991
JP    07-013686 A    1/1995
(Continued)

OTHER PUBLICATIONS

Google—Menu, http://web.archive.org/web/20071126111737/http://www.google.com/, Nov. 26, 2007, pp. 1-2.*
(Continued)

*Primary Examiner* — Alvin Tan
*Assistant Examiner* — James G Pohlman
(74) *Attorney, Agent, or Firm* — NSIP Law

(57) ABSTRACT

The letter input method of the present invention comprises: a first step of enabling a letter input window including an end button to be displayed on a touch screen at a location separate from a word input window, when a user applies contact pressure to the word input window of the web browser or web site displayed on the touch screen; a second step of inputting relevant letters to the word input window, when the user inputs characters to the character input window; and a third step of generating a driving signal such that the search engine associated with the word input window can be driven by using the letters input to the word input window as search data, when the user selects the end button. The letter input method of the present invention enables users to input letters on the touch screen simply by touch instead of a separate keyboard or a mouse, enables the driving of a search engine of the web browser or a web site to be performed on the letter input screen, and enables the simple selection of a search engine to be used.

10 Claims, 16 Drawing Sheets

(56) References Cited

U.S. PATENT DOCUMENTS

| | | | |
|---|---|---|---|
| 7,499,033 B2 * | 3/2009 | Wilde et al. | 345/173 |
| 7,831,922 B2 * | 11/2010 | Huapaya et al. | 715/768 |
| 7,996,589 B2 * | 8/2011 | Schultz et al. | 710/73 |
| 8,064,702 B2 * | 11/2011 | Markiewicz et al. | 382/187 |
| 8,116,569 B2 * | 2/2012 | Markiewicz et al. | 382/186 |
| 8,255,822 B2 * | 8/2012 | Markiewicz et al. | 715/780 |
| 2003/0001899 A1 * | 1/2003 | Partanen et al. | 345/800 |
| 2005/0099407 A1 * | 5/2005 | Pennington et al. | 345/179 |
| 2008/0235578 A1 * | 9/2008 | Heed et al. | 715/269 |

FOREIGN PATENT DOCUMENTS

| | | |
|---|---|---|
| JP | 10-063408 A | 3/1998 |
| JP | 11-053116 A | 2/1999 |
| JP | 2000-003242 A | 1/2000 |
| JP | 2001-014096 A | 1/2001 |

OTHER PUBLICATIONS

Internet Explorer 7, http://windows.microsoft.com/is-Is/windows7/Change-or-choose-a-search-provider-in-Internet-Explorer, Oct. 18, 2006, pp. 1-2.*

Geeks on Tour Blog, http://web.archive.org/web/20070921090128/http://geeksontour.blogspot.com/2007/02/searching-blogs-and-searching-for-blogs.html, Sep. 21, 2007, pp. 1-5.*

Update at Google Product Search, http://web.archive.org/web/20080430211618/http://googlesystem.blogspot.com/2008/04/update-at-google-product-search.html, Apr. 30, 2008, pp. 1-3.*

Internet Explorer Search History, http://searchenginewatch.com/article/2065539/Clearing-Your-Search-History-From-Google-And-Other-Search-Engines, Jan. 6, 2003, pp. 2-3.*

Vonage, http://www.techrepublic.com/article/product-review-the-vonage-v-phone-does-everything-it-is-supposed-to-do-flawlessly/6130250, Oct. 27, 2006, p. 1.*

* cited by examiner

LETTER INPUT METHOD

CROSS-REFERENCES TO RELATED APPLICATIONS

This application is a U.S. national phase application, pursuant to 35 U.S.C. §371, of PCT/KR2009/004608, filed Aug. 19, 2009, designating the United States, which claims priority to Korean Application No. 10-2008-0097255, filed Oct. 2, 2008. The entire contents of the aforementioned patent applications are incorporated herein by this reference.

TECHNICAL FIELD

The present invention relates to a text input method, with which text can be input by touching a text input screen instead of using a keyboard or mouse, and with which a search engine of a web browser or one of various websites can also be operated using the text input screen.

BACKGROUND ART

These days, the Internet communication network is binding the whole world into one network with computers. The Internet has already become a part of life. Internet users are not limited to a specific group of people who use the Internet for specific purposes for a short time, and the Internet is taking its position among average people who use it as means for obtaining information for everyday life or spending their leisure time.

While there are likely several reasons for the increase in the base of Internet users, the development of Personal Computer (PC) operating systems from the Disk Operating System (DOS), which is difficult to use, into the Windows operating system, which is easy and convenient to use, can also be regarded as one reason.

One of characteristics of the Windows operating system is the convenient use of various types of instruction input means, such as a mouse, a joystick, or a digitizer, at the same time instead of limiting the instruction input means to a keyboard. This characteristic allows a user to execute intended instructions even if he/she does not understand the operating system or instructions of the computer system.

However, even in such an environment, the use of the keyboard is essential in order to input the address of a website, an ID, a password, a keyword, or the like. This is ultimately caused by the characteristics of the alphabet system, which includes many components. Specifically, the English alphabet includes 26 consonants and vowels, and Hangul (the Korean alphabet) includes 33 consonants and vowels (including consonant digraphs and vowel digraphs).

In addition, since the address of a website that a user intends to visit while Internet surfing must be input into the address bar as a text string, a handicapped person, who can use a mouse, a joystick, or the like but has difficulty using a keyboard because of a disabled hand, or an elderly person or child, who is clumsy and has difficulty operating the keyboard, visits only his/her favorite websites by unavoidably coming to rely on the mouse. Therefore, there is a problem in that the use of the Internet, which contains a wide range of functions and vast amounts of information, is limited.

In order to solve this problem, a text input window, which is provided on a web browser or a website such that intended text can be input using only a mouse, and a text input method using the text input window have been proposed.

A description is given below of a text input window and a text input method using the same of the related art with reference to the accompanying drawings.

FIG. 1 is a view showing the screen of a typical web browser, FIG. 2 is a view showing the state in which a text input window of the related art is displayed above the web browser, and FIG. 3 is a view showing the configuration of the screen of the text input window of the related art.

As shown in FIG. 1, the typical web browser 10 includes a web page window 12, on which an accessed web page is displayed, a toolbar 14, on which tools necessary for using the web browser are displayed, and an address bar 16, into which the address of the website that the user intends to access is input. In addition, when the accessed web page is a portal site or a website, a search window 18 into which a keyword is input is displayed on the web page.

Here, when a mouse cursor is located in the address bar 16 or the search window 18, and a signal is input using a function key (not shown) of the mouse to operate the text input window, a text input window 20 is displayed on the web browser, as shown in FIG. 2. The text input window 20 includes a virtual keyboard 22, which has keys configured substantially the same as on an actual keyboard, a preview window 24, on which a corresponding letter is displayed when the user clicks a key by locating the mouse cursor on the virtual keyboard, and execution buttons 26, which are used to input an execution signal to send or cancel an input letter.

Therefore, when the user clicks a letter key on the virtual keyboard 22 using the mouse, the corresponding letter is displayed in the preview window 24. When one execution button 26 is pushed after the process of inputting text is completed, the text displayed in the preview window 24 is input into the address bar 16 or the search window 18. Accordingly, the text input window 20 of the related art makes it possible to input text on the web browser 10 using only the mouse.

The information disclosed in this Background of the Invention section is only for the enhancement of understanding of the background of the invention and should not be taken as an acknowledgment or any form of suggestion that this information forms the prior art that would already be known to a person skilled in the art.

DISCLOSURE

Technical Problem

However, the foregoing text input method using the text input window 20 has drawbacks in that it requires a mouse in the course of clicking the letter keys, and in that it is difficult to apply to a portable terminal, in which a touch screen function of inputting text by directly touching a screen is realized.

Consequently, a text input method, in which a display screen of a portable terminal is used as a touch screen so that a user can input text by writing it by hand, has been developed and used so that the user can input letters without using a keyboard or mouse. However, in the text input methods that have been developed to date, it is possible only to input text; a search engine of a web browser cannot be operated and a website cannot be navigated. After text has been input into a text input screen, additional manipulation for operating the search engine must be performed on a web browser or website screen.

The present invention has been devised in order to solve the foregoing problems, and therefore provides a text input method, with which text can be input by touching a text input screen instead of using a keyboard or mouse, and with which a search engine of a web browser can be operated and multiple websites can be navigated on the text input screen.

Technical Solution

In order to realize the foregoing object, the text input method of the present invention includes:

a first step of displaying, when a user applies contact pressure on a word input bar of a web browser or a website that is displayed on a touch screen, a text input window including a complete button on a position of the touch screen that is beyond the word input bar;

a second step of inputting, when the user inputs text into the text input window, the corresponding text into the word input bar; and a third step of generating, when the user selects the complete button, an operation signal so that a search engine associated with the word input bar is operated using the text that is input into the word input bar as a search data.

After the first step, the text input window may disappear when contact pressure is applied once or more on the position of the touch screen that is beyond the text input window.

The text input window may be displayed in contact with the word input bar.

The second step may be configured to input, when the user writes a letter by hand on the text input window, a letter that is most similar to the shape of the letter written by the user into the word input bar.

In the second step, when the user applies contact pressure on the touch screen by crossing a point in the text input window on which a letter is written while inputting the text into the text input window, a letter corresponding to the point on which the contact pressure is applied may be erased.

The complete button may include a general search button and an extensive search button. The third step may include the steps of:

operating, if the general search button is selected, a search engine designated as default, and displaying, if the extensive search button is selected, a website selection window equipped with one or more website selection buttons, and operating, if one of the website selection buttons is selected, a search engine corresponding to the selected website selection button.

The website selection window may be displayed in contact with an outline of the extensive search button.

The website selection window may be displayed inside the text input window.

The complete button may include a general search button and an extensive search button. The may include the steps of:

operating, if the general search button (220) is selected, a search engine designated as default, and displaying, if the extensive search button is selected, a field selection window equipped with one or more field selection buttons, displaying, if one of the field selection buttons is selected, displaying the website selection window equipped with one or more website selection buttons, and operating, if one of the website selection buttons is selected, a search engine corresponding to the selected website selection button.

The field selection window may be displayed in contact with an outline of the extensive search button.

The website selection window may be displayed in contact with an outline of the field selection window.

The field selection window and the website selection window may be displayed in the text input window.

When a search engine of a selected website is operated, a selected website screen may be displayed in the entire area of the touch screen or in the text input window.

The text input into the word input bar may be stored in a memory if the search engine is operated using the text input into the word input bar as a search data.

The search engine may be operated using text that is most recently stored in the memory as a search data if the complete button is selected in the state in which the text is not input into the word input bar.

The text input into the word input bar may be stored in a memory if the search engine is operated using the text input into the word input bar as a search data.

After one or more texts are input into the word input bar, if the complete button is selected in the state in which no text is input into the word input bar, the texts stored in the memory may be displayed in the text input window.

If one of the texts displayed in the text input window (100) is selected, the search engine may be operated using the selected text as a search data.

If the complete button is selected in the state in which no text is input into the word input bar, the texts are displayed in the text input window in such a fashion that two or more of the texts may be displayed in an order reverse to that in the memory, or the texts may be displayed one by one in an order reverse to that in the memory at every time that the user selects the complete button.

The first step may include the step of further displaying a telephone button, the telephone button forwarding numbers that are input into the word input bar to an Internet telephone transceiver.

Advantageous Effects

According to the text input method of the present invention, there are advantages in that input text can be input merely through the manipulation of touching a touch screen without using a separate signal input device, such as a keyboard or a mouse, a search engine of a web browser can be operated, a website can also be navigated on a text input screen, and a search engine that is intended to use can be easily selected.

In addition, the text input method of the present invention has advantages in that text that is intended to be input can be simply input, and signals can be input using an Internet telephone transceiver.

MODE FOR INVENTION

Embodiments of a text input method according to the present invention are described in detail with reference to the accompanying drawings.

Figure 1:
FIG. 1 is a view showing the screen of a typical web browser.
Figure 2:
FIG. 2 is a view showing the state in which a text input window of the related art is displayed above the web browser.
Figure 3:
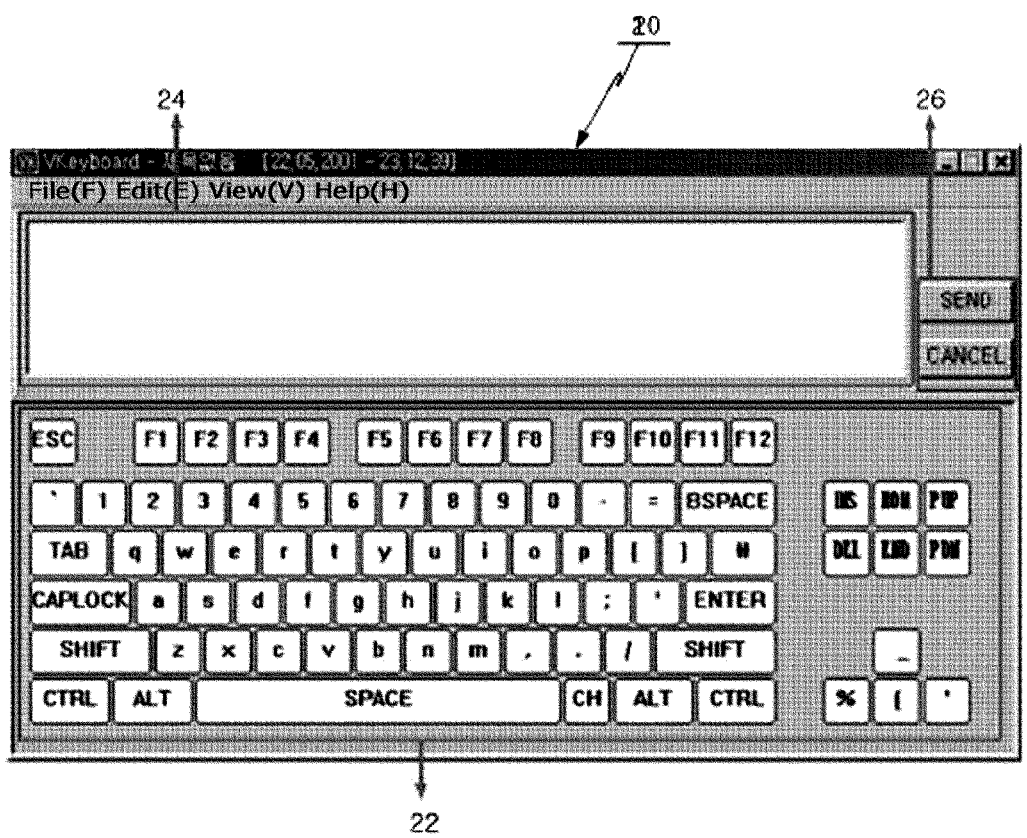
FIG. 3 is a view showing the configuration of the screen of the text input window of the related art.
Figure 4:
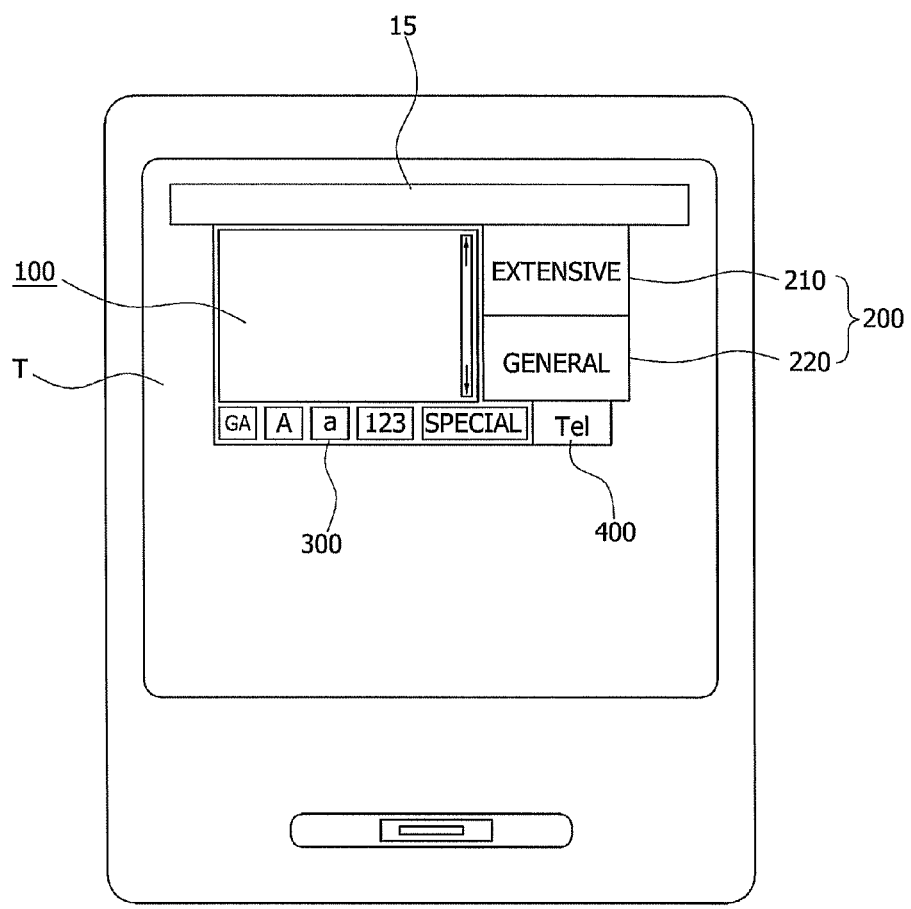
FIGS. 4 to 6 show the process of executing search using a text input method of the present invention.
Figure 5:
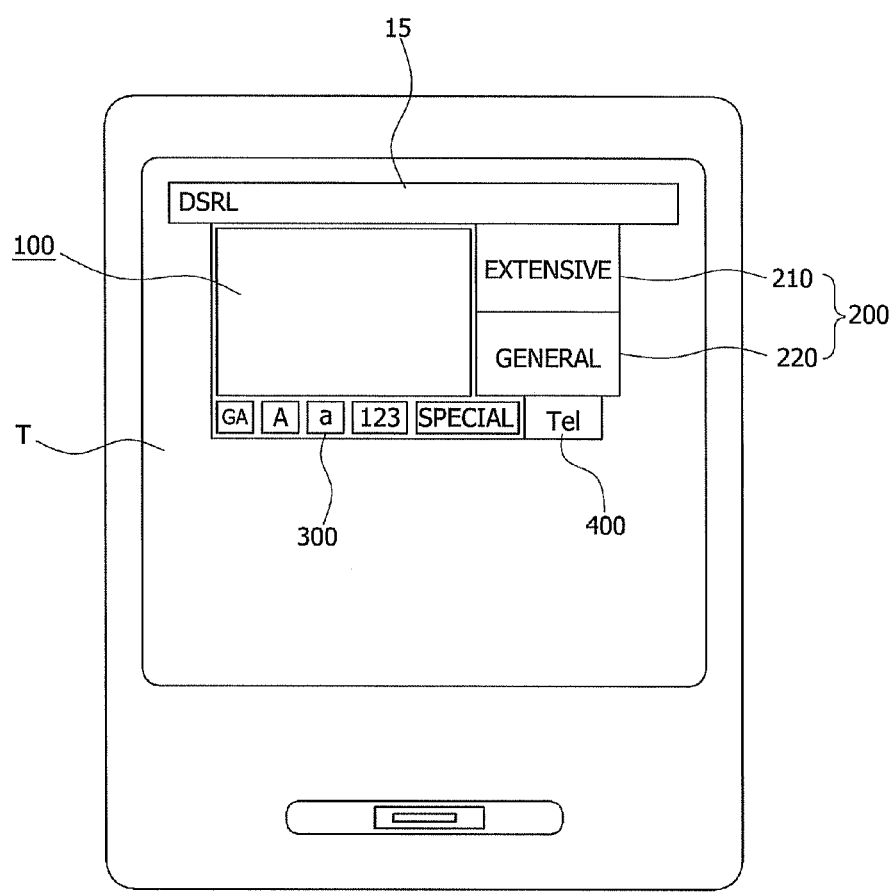
Figure 6:
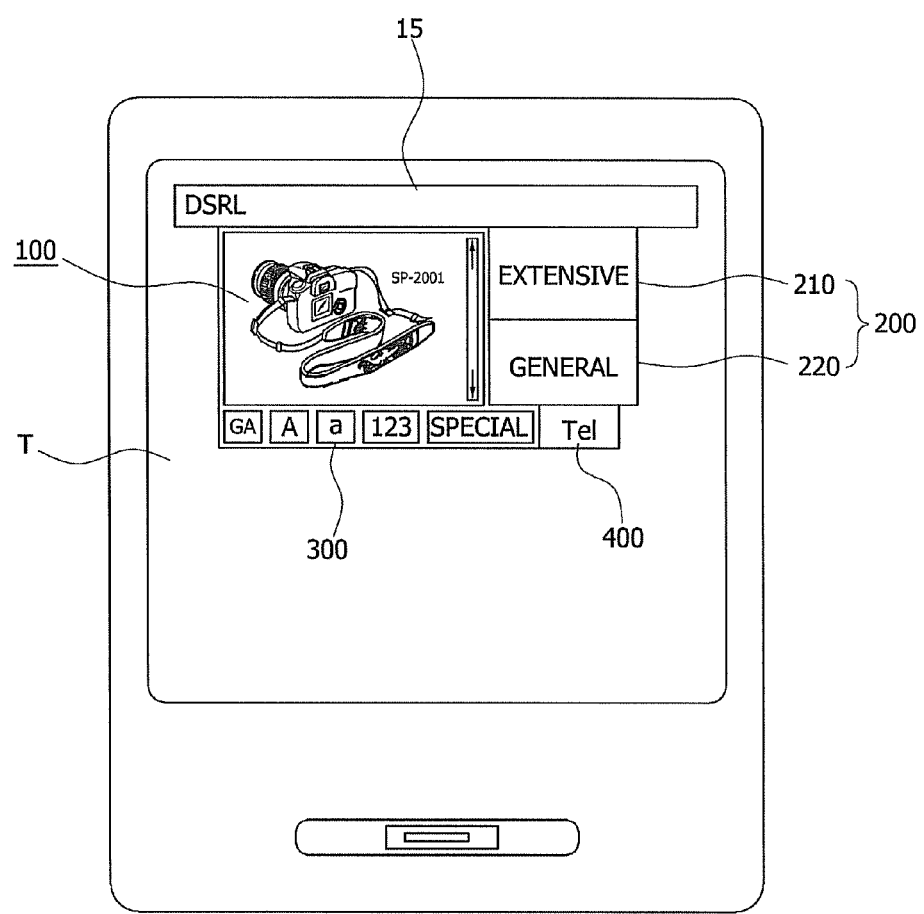

FIGS. 4 to 6 show the process of executing search using a text input method of the present invention.

The text input method of the present invention is characterized in that a letter is input through the operation of touching a touch screen T, so that the letter can be easily input without using an additional signal input device, such as a keyboard or mouse.

In the event of attempting to input a letter using the text input method of the invention, the user first applies contact pressure on a word input bar 15 of a web browser or a website that is displayed on the touch screen T. When the contact pressure is applied to the word input bar 15, the text input window 100 is displayed on the touch screen T, as shown in FIG. 4. The text input window 100 is displayed in a position where it does not overlap the word input bar 15, so that the user can visually check the letter that is input into the word input bar 15. It is preferred that the text input window 100 be displayed in contact with the word input bar 15, as illustrated in this embodiment, in order to minimize the distance to the text input window 100 after the user has applied the contact pressure to the word input bar 15. Here, when applying the contact pressure to the word input bar 15, the user can use either a separately provided stylus pen or his/her finger.

The text input window 100 can be configured such that a plurality of text input buttons is displayed so that a letter is input when a user selects and presses a text input button, or can be configured such that, when the user writes a letter by hand on the text input window 100, the letter that is most similar to the shape of the letter written by the user is input into the word input bar 15. The technology in which the user inputs a letter by writing it by hand on the touch screen T is commercially distributed and is generally used, and thus a detailed description thereof will be omitted.

In addition, a mode change button 300 can be additionally displayed in the text input window 100. The mode change button 300 makes it possible to change the type of input letter so that the user can input one type of letter by selecting it from among Hangul, capital alphabet letters, small alphabet letters, and special symbols. In addition, a telephone button 400, which forwards numbers that are input into the word input bar 15 to an Internet call transceiver, can be additionally displayed in the text input window 100 so that the user can make an Internet call to an input telephone number after the telephone number is input into the word input bar 15. Such an Internet call transceiver that makes an Internet call to the forwarded telephone number is already commercially distributed and is generally used, and thus a detailed description of the configuration and the principle of operation thereof will be omitted.

In addition, it is preferred that the text input window 100 be configured such that it disappears when the user applies contact pressure once or more onto a point of the touch screen T that is beyond the text input window 100. The user can then cancel the process of inputting text during the process of inputting text into the text input window 100. In addition, it can be configured such that, when the user applies contact pressure on the touch screen T by crossing a point in the text input window 100 on which a letter is written while writing text into the text input window 100, that is, when the user applies contact pressure as if erasing the letter written in the text input window 100 using an eraser, the letter corresponding to the point on which the contact pressure is applied can be erased.

When the user inputs text into the text input window 100 as above, corresponding text is input into the word input bar 15, as shown in FIG. 5.

A complete button 200 is provided adjacent to the text input window 100. When the user selects the complete button 200 after the process of inputting text into the word input bar 15 is completed, an operation signal is generated so that a search engine associated with the word input bar 15 is operated using the text that has been input into the word input bar 15 as a search data.

Here, the complete button 200 includes a general search button 220 and an extensive search button 210. When the general search button 220 is selected, the search engine that is designated as the default is operated. When the extensive search button 210 is selected, the user can select a search engine.

A website selection window 214 equipped with one or more website selection buttons is displayed, and when one website selection button is selected, the search engine of the corresponding website is operated.

Specifically, as shown in FIG. 5, when the user selects the general search button 220 in the state in which text is input into the word input bar 15, the search engine that is designated as the default is operated using the text that is input into the word input bar 15 as a search data, and thus the search result is displayed in the text input window 100, as shown in FIG. 6. Here, the search result can be displayed in the text input window 100, as in this embodiment, or be displayed across the entire area of the touch screen T.

Here, the process in response to the user selecting the extensive search button 210 in the state in which text is input into the word input bar 15 is described in detail with reference to FIGS. 7 to 10.

FIGS. 7 to 10 show the process of selecting a search engine using the text input method of the present invention.

Figure 7:
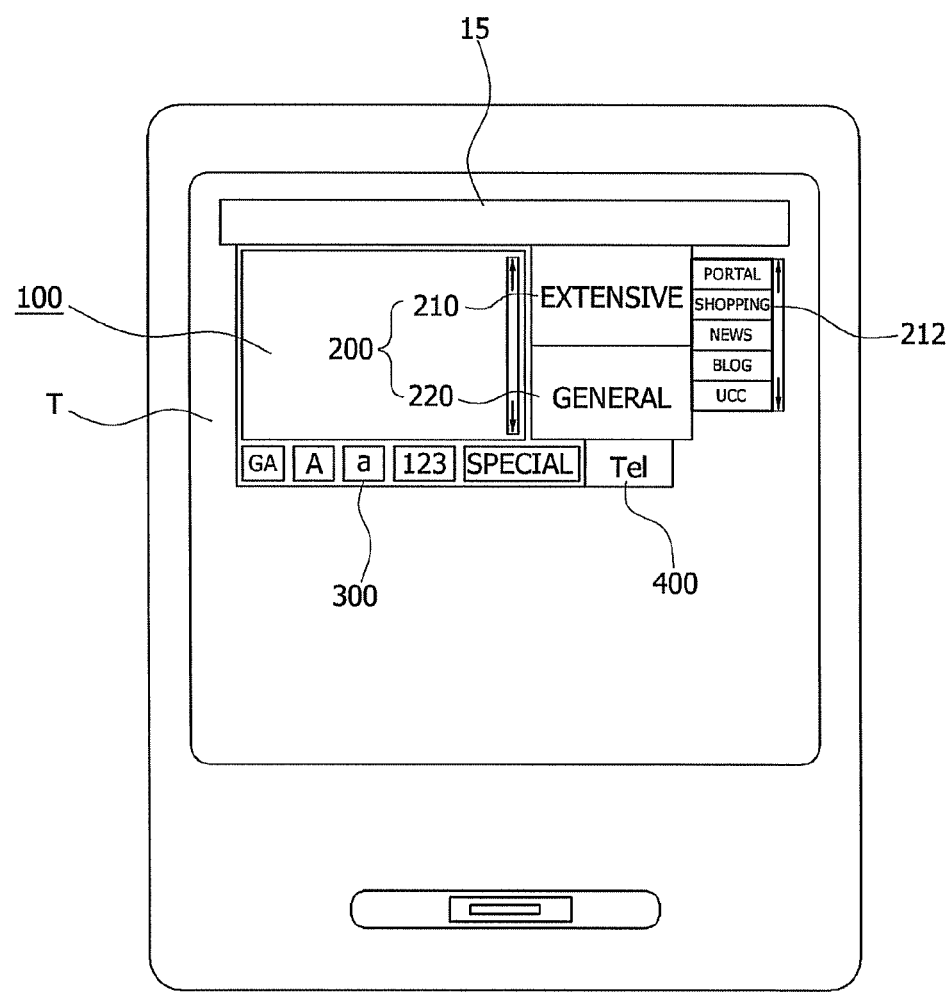
FIGS. 7 to 10 show the process of selecting a search engine using the text input method of the present invention.

When the user selects the extensive search button in the state in which text is input into the word input bar 15 shown in FIG. 5, a field selection window 212 equipped with one or more field selection buttons is displayed, as shown in FIG. 7, so that the user can select the field of a search engine in order to search for the text input into the word input bar 15.

Figure 8:
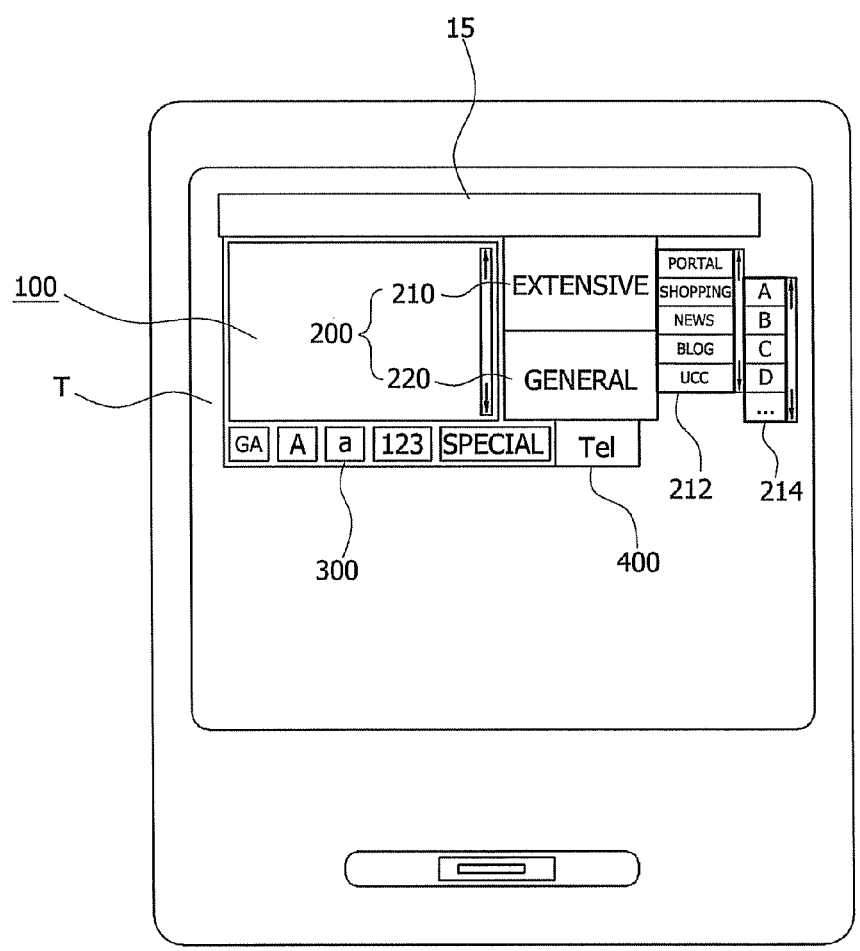

For example, if the text input into the word input bar 15 is a keyword relating to shopping, the user selects a field selection button corresponding to "shopping" from the field selection window 212. When the field selection button corresponding to "shopping" is selected, a website selection window 214 equipped with one or more selection buttons that represent websites relating to "shopping" is displayed as shown in FIG. 8. When the website selection button is selected, a search engine of the corresponding website is operated.

Here, it is preferred that the field selection window 212 be displayed in contact with the outline of the extensive search button 210 in order to minimize the distance from the extensive search button 210 to the field selection window 212, and that the website selection window 214 be displayed in contact with the outline of the field selection window 212 in order to minimize the distance from the field selection window 212 to the website selection window 214.

In addition, although this embodiment has been described only with respect to the case in which the field selection window 212 and the website selection window 214 are sequentially displayed when the extensive search button 210 is selected, the website selection window 214 can be directly operated without through the field selection window 212 when the extensive search button 210 is selected.

Furthermore, the field selection window 212 and the website selection window 214 can be displayed in the text input window 100.

Figure 9:
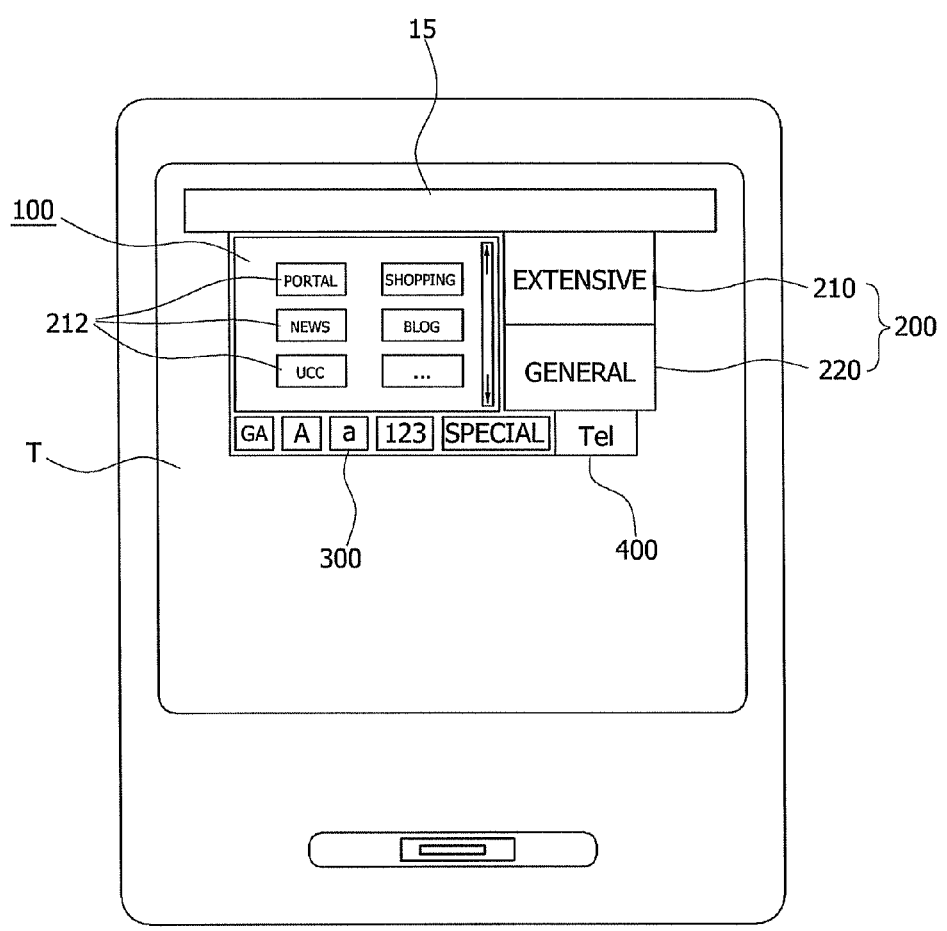

Specifically, when the user selects the extensive search button in the state in which text is input into the word input bar 15 shown in FIG. 5, at least one field selection window 212 can be displayed in the text input window 100 as shown in FIG. 9. The field selection window 212 displayed in the text input window 100 as above leads to an advantage in that the size of the text input window 100 can be maximized in the touch screen T having a limited size.

Figure 10:
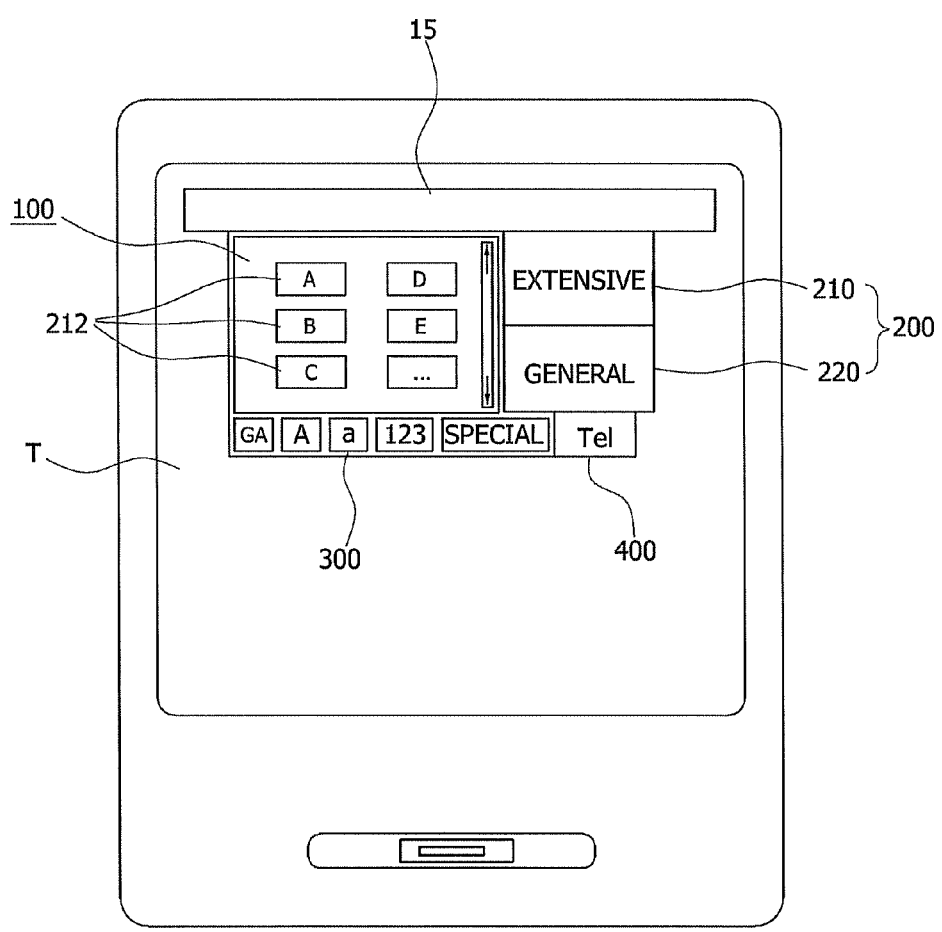

In addition, when the field selection button corresponding to "shopping" is selected in the state shown in FIG. 9, the website selection window 214 is displayed in the text input window 100 as shown in FIG. 10.

Figure 11:
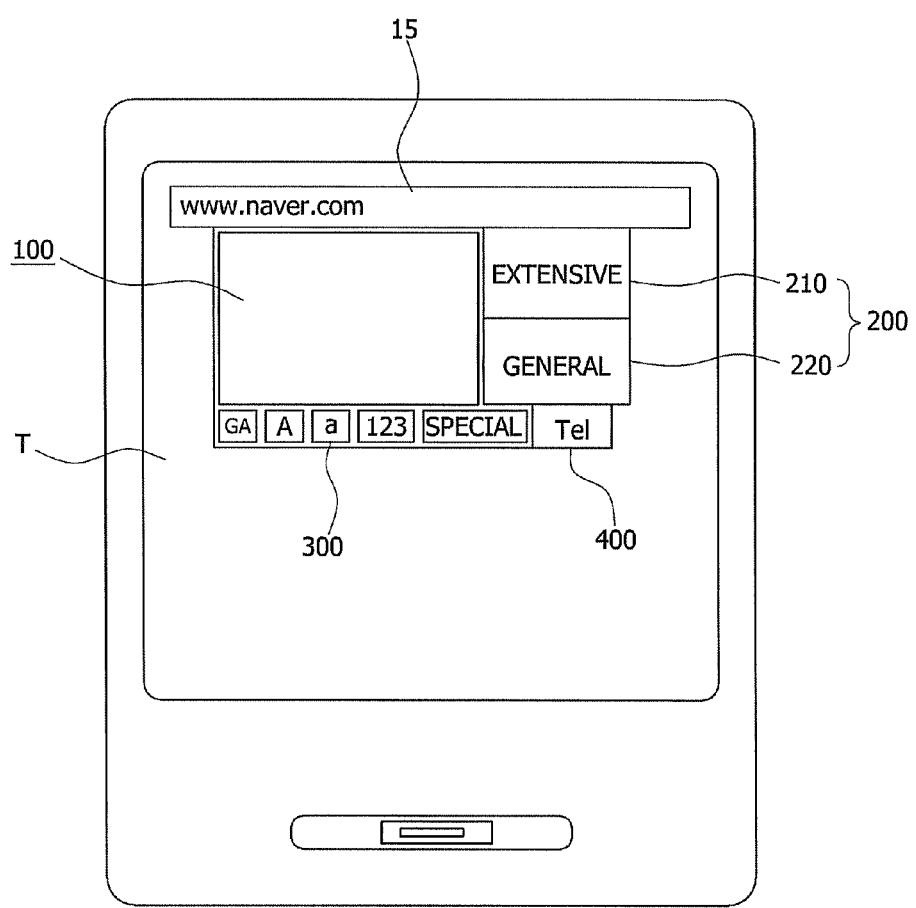
FIGS. 11 and 12 show the process of accessing a website using the text input method of the invention.
Figure 12:
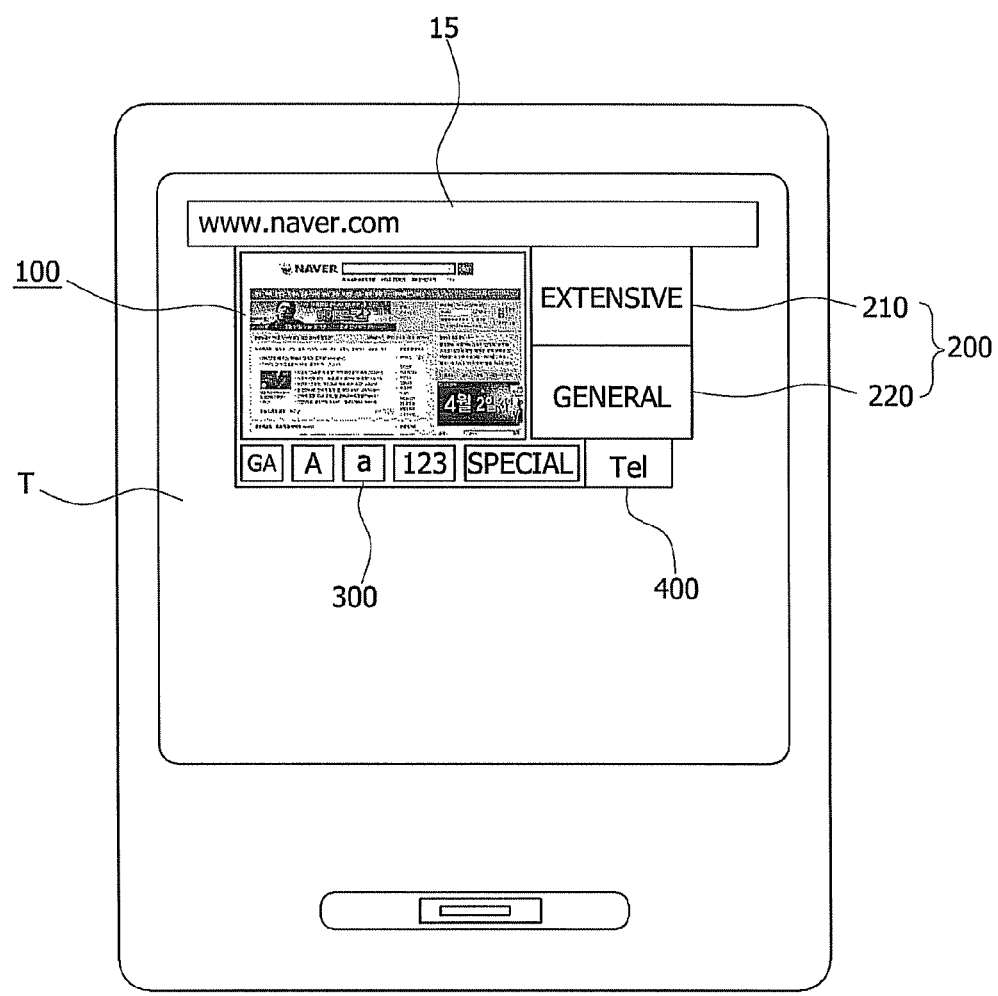

FIGS. 11 and 12 show the process of accessing a website using the text input method of the invention.

If the word input bar 15 on which the user applies contact pressure is an address bar into which an Internet address for accessing a specific website is input, a domain address can be input into the address bar using the text input method of the invention, as shown in FIG. 11.

Since the process of inputting the domain address into the text input window 100 is the same as the text input process shown in FIG. 5, a detailed description thereof will be omitted.

When inputting the domain address into the window bar is completed, the user can access an intended website by selecting the complete button 200, as shown in FIG. 12. The website screen can be displayed in the text input window 100, as shown in FIG. 12, or displayed over the entire area of the touch screen T.

In addition, if the word input bar 15 is not a web browser address bar but a website search bar, a search engine that is designated as the default is operated when the general search button 220 is selected after the domain address is input into the search bar. When the extensive search button 210 is selected, it is possible to directly access the website of the domain address.

FIGS. 13 to 16 show the process of searching for a file using the text input method of the invention.

Figure 13:
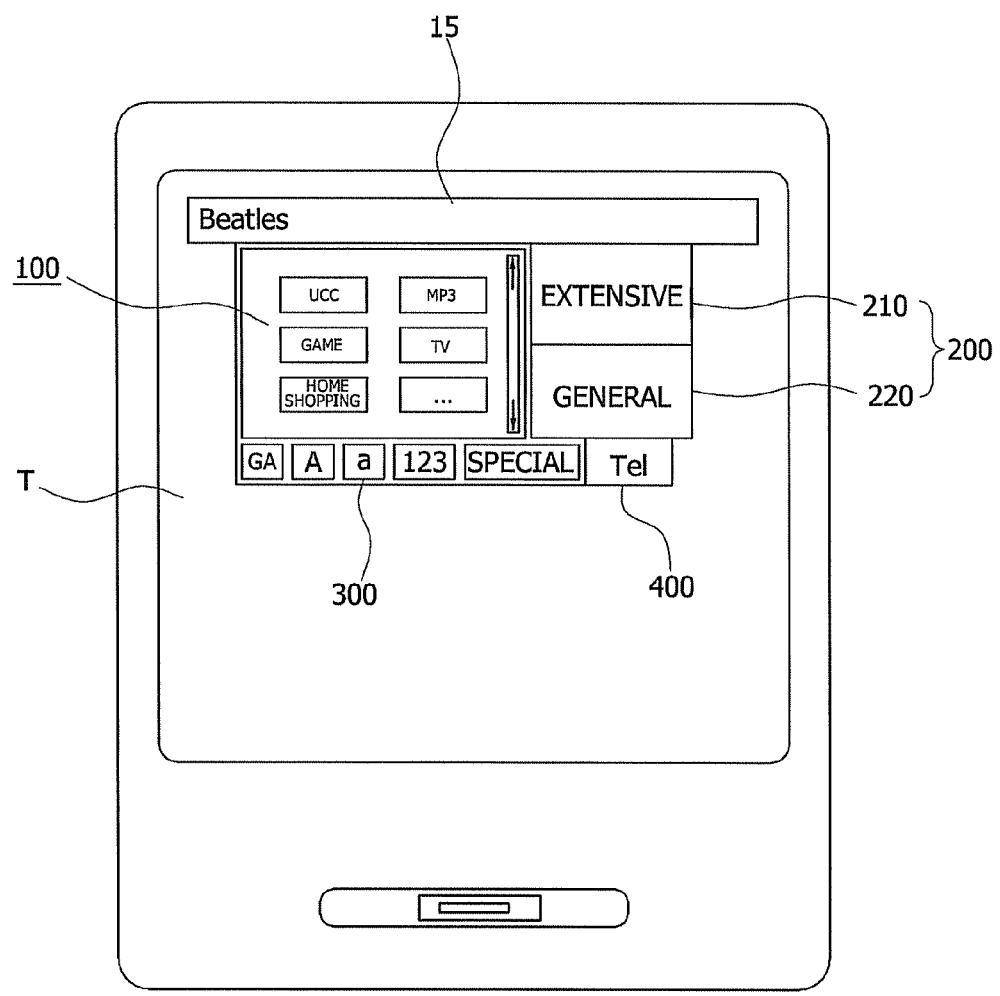
FIGS. 13 to 16 show the process of searching for a file using the text input method of the invention.
Figure 14:
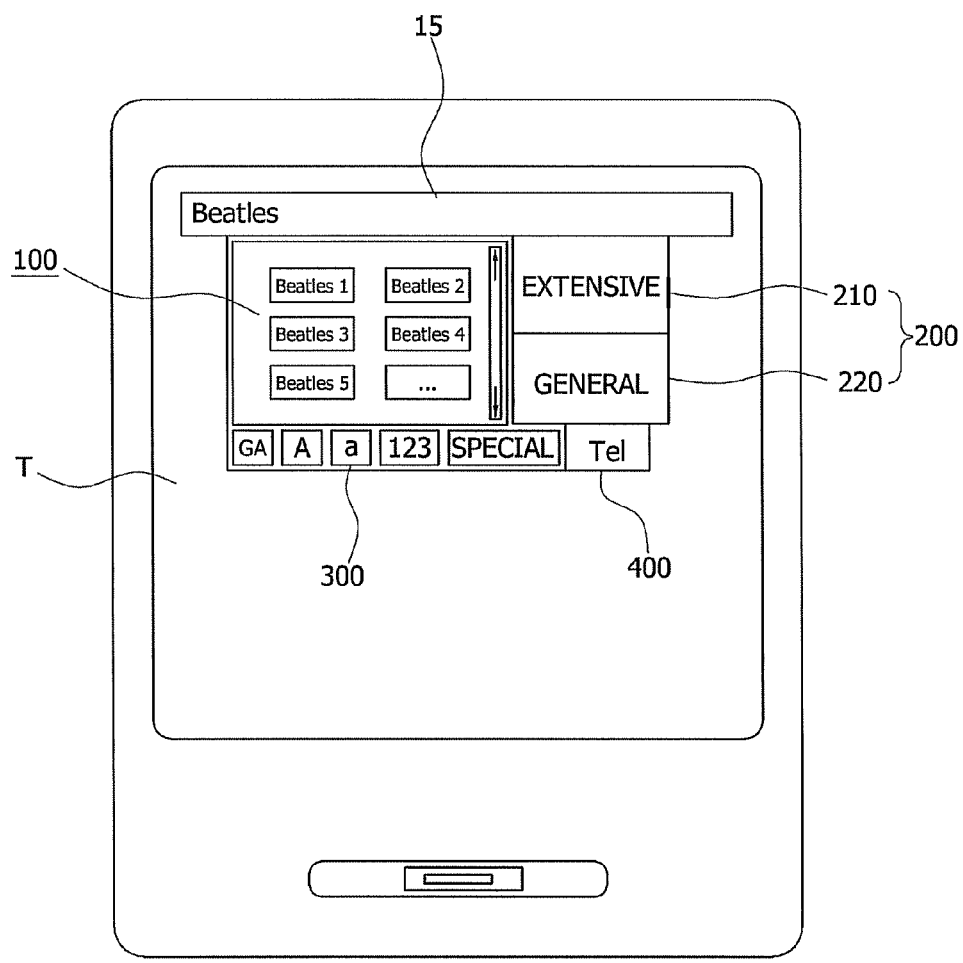

In the event of attempting to search for a file using the text input method of the invention, a keyword of the file, for which the user intends to search, is input into the word input bar 15, and then the extensive search button 210 is pushed. When the field selection window 212 shown in FIG. 13 is displayed, the user determines the field, to which the file that he/she intends to find belongs, and selects a corresponding field selection button. Consequently, related files can be searched, as shown in FIG. 14.

Figure 15:
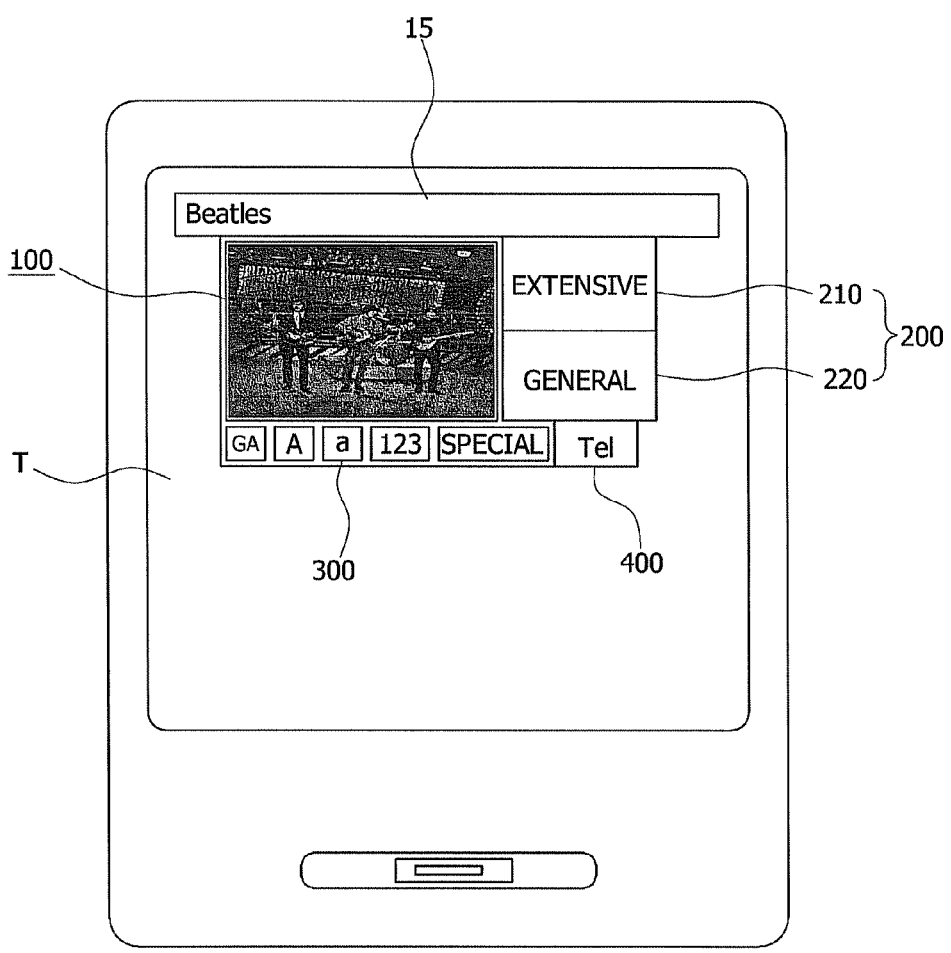
Figure 16:
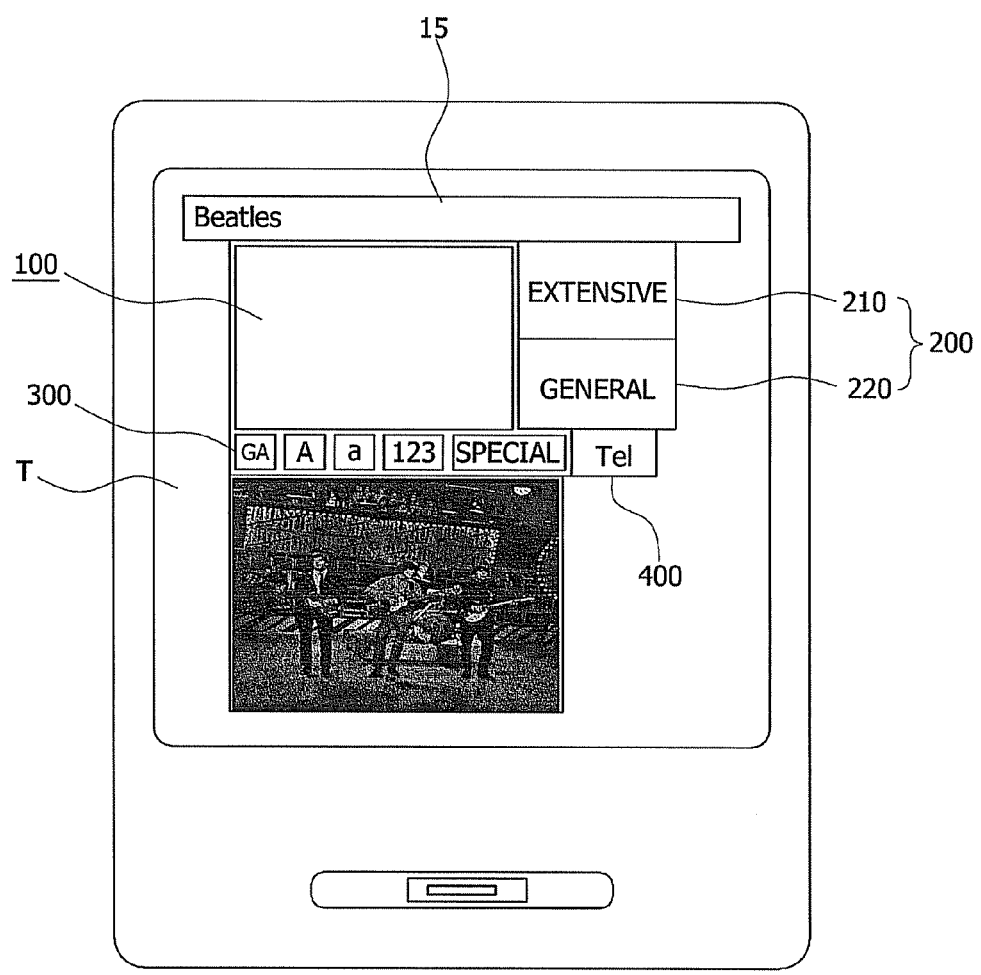

When the user selects one of the searched files, if the selected file is a dynamic image file, a dynamic image is played in the text input window 100, as shown in FIG. 15. The dynamic image can be played in the text input window 100, as shown in FIG. 15, or by a dynamic image player, which is separately displayed, as shown in FIG. 16.

The text input method of the invention as described above has advantages in that its use is very simple, since not only the simple text input function, but also keyword searching, website accessing, file searching, file execution, or the like can be performed on the text input screen.

In addition, in the case in which text is input into the word input bar 15 and the search engine is operated using the text input method of the invention, the text that is input into the word input bar 15 can be stored in a separate memory (not shown).

If the text that was input into the word input bar 15 and was used to operate the search engine is stored in the separate memory, when the user intends to input the text that he/she inputted once, he/she can simply input the text by outputting the text that is stored in the memory instead of pressing the text buttons one by one or writing the text.

In an example, in the case in which text that was input into the word input bar 15 is most recently stored, if the user selects the complete button 200 in the state in which no text is input into the text input window 100, the search engine can be operated using the text stored in the memory as a search data.

In addition, in the case in which a number of texts are stored in the memory, if the user selects the complete button 200 in the state no text is input into the text input window 100, the texts stored in the memory are displayed in the text input window 100. Consequently, the user can select one of the displayed texts and input the selected text into the word input bar 15.

If the complete button 200 is selected by the user in the state in which no text is input into the text input window 100, the texts are displayed in the text input window 100 in such a fashion that two or more of the texts can be displayed in the order reverse to that in the memory (i.e. text that was most recently stored comes first). Alternatively, the texts can be displayed one by one in the order reverse to that in the memory (i.e. text that was most recently stored comes first) at every time that the user selects the complete button 200.

If the text that is input by the user is an ID or password that is concerned in association with private information leakage, the memory can be equipped with a search and filter function so that it can filter the ID and the password by itself.

While the present invention has been shown and described with reference to the certain exemplary embodiments thereof, the scope of the invention is by no means limited to the specific embodiments. Rather, the scope of the invention shall be defined by the accompanying claims. It will be understood by those skilled in the art that various changes in forms and details may be made therein without departing from the spirit and scope of the present invention.

The invention claimed is:

1. A text input method comprising:
displaying, in response to a user applying contact pressure on a word input bar of a web browser or a website that is displayed on a touch screen, a text input window comprising a complete button on a position of the touch screen that is beyond the word input bar;
inputting, in response to the user inputting text into the text input window, corresponding text into the word input bar; and
generating, in response to the user selecting the complete button, an operation signal so that a search engine associated with the word input bar is operated using the text that is input into the word input bar as a search data,
wherein the complete button comprises a general search button and an extensive search button;
an area of the text input window is on a position of the touch screen that is beyond the word input bar and is configured to input corresponding text into the word input bar in response to the user inputting text via touch input at any location within the area;
the generating the operation signal comprises
operating, in response to the general search button being selected, the search engine designated as default, and
displaying, in response to the extensive search button being selected, a field selection window equipped with one or more field selection buttons, displaying, in response to one of the field selection buttons being selected, the website selection window equipped with one or more website selection buttons, and operating, in response to one of the website selection buttons being selected, another search engine corresponding to the selected website selection button, the field selection window and the website selection window are displayed inside the area of the text input window, and the website selection window is displayed inside the area of the text input window in response to the display of the field selection window being finished.

2. The text input method of claim 1, wherein, after the first step, the text input window disappears when contact pressure is applied once or more on the position of the touch screen that is beyond the text input window.

3. The text input method of claim 1, wherein the text input window is displayed in contact with the word input bar.

4. The text input method of claim 1, wherein the second step comprises inputting, when the user writes a letter by hand on the text input window, a letter that is most similar to a shape of the letter written by the user into the word input bar.

5. The text input method of claim 1, wherein, in the second step, when the user applies contact pressure on the touch screen by crossing a point in the text input window on which a letter is written while inputting the text into the text input window, a letter corresponding to the point on which the contact pressure is applied is erased.

6. The text input method of one of claims 1 to 5, wherein a selected website screen is displayed in an entire area of the touch screen or in the text input window when a search engine of a selected website is operated.

7. The text input method of one of claims 1 to 5, wherein the text input into the word input bar is stored in a memory in response to the search engine being operated using the text input into the word input bar as a search data, and wherein the search engine is operated using text that is most recently stored in the memory as a search data in response to the complete button being selected in a state in which the text is not input into the word input bar.

8. The text input method of one of claims 1 to 5, wherein the text that is input into the word input bar is stored in a memory in response to the search engine is operated using the text input into the word input bar as a search data,
wherein, after one or more texts are input into the word input bar 15, in response to the complete button is selected in a state in which no text is input into the word input bar, the texts stored in the memory are displayed in the text input window, and
wherein, in response to one of the texts displayed in the text input window is selected, the search engine is operated using the selected text as a search data.

9. The text input method of claim 8, wherein, in response to the complete button is selected in a state in which no text is input into the word input bar,
the texts are displayed in the text input window in such a fashion that two or more of the texts are displayed in an order reverse to that in the memory, or the texts are displayed one by one in an order reverse to that in the memory at every time that the user selects the complete button.

10. The text input method of one of claims 1 to 5, wherein the first step comprises further displaying a telephone button, the telephone button forwarding numbers that are input into the word input bar to an Internet telephone transceiver.

* * * * *